Patented Feb. 28, 1933

1,899,213

UNITED STATES PATENT OFFICE

HENRY B. SMITH, OF ROCHESTER, NEW YORK, ASSIGNOR TO EASTMAN KODAK COMPANY, OF ROCHESTER, NEW YORK, A CORPORATION OF NEW YORK

CELLULOSE ACETATE COMPOSITIONS CONTAINING OXIMES

No Drawing. Application filed February 10, 1932. Serial No. 592,181.

This invention relates to compositions of matter in which cellulose organic esters, such as cellulose acetate, are combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, artificial silk, varnishes or lacquers, coating compositions and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce a composition of matter which is capable of easy and convenient manipulation in the plastic and analogous arts, such as in the manufacture of sheets, films, artificial silk filaments, varnishes, lacquers and the like, and to produce a composition which will not injure, or be injured by, the substances or surfaces with which it is associated during manufacture. Another object of my invention is to produce compositions which can be molded at elevated temperatures and high pressures to produce plastic products having the desirable properties of celluloid. Other objects will become apparent to those skilled in the art to which this invention pertains.

While cellulose acetate has been known for decades, it has also been known that to utilize it in various plastic arts it is necessary to mix therewith such plasticizing or conditioning agents as triphenyl phosphate, monochlornaphthalene or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose acetate to prepare it for use in the other plastic arts, such as in the manufacture of lacquers, varnishes, artificial silk filaments, molded compounds and the like. While the plasticizers or other addition agents heretofore discovered have had their utility in the art, the increasing use to which cellulose acetate has been put and the increasing number of desirable properties required of cellulose acetate for most purposes have made the discovery of new and economical plasticizers or other addition agents a matter of considerable importance to the art. This has been a problem of some difficulty, since many of the nitrocellulose solvents are not solvents for cellulose acetate, and many substances which act as plasticizers for nitrocellulose are not sufficiently compatible with cellulose acetate to be used as plasticizers in cellulose acetate compositions.

I have discovered that valuable properties may be induced in and/or contributed to compositions containing organic derivatives of cellulose, such as cellulose acetate, by adding thereto as plasticizing compounds certain oximes, namely acetophenone oxime, diacetyl monoxime, cyclohexanone oxime, and furfural oxime. These oximes have all been described in the literature. The particularly useful properties which they induce in or contribute to cellulosic compositions containing them are hereinafter enumerated.

In order that those skilled in this art may better understand my invention, I would state, by way of illustration, that for the manufacture of photographic film or other sheets my new compositions of matter may be compounded as follows: 100 parts of acetone-soluble cellulose acetate, i. e. cellulose acetate containing from 36% to 42% acetyl radical, approximately, is dissolved with stirring at atmospheric temperature in 300 to 500 parts, preferably 400 parts, by weight, of acetone. To this solution may be added from 10 to about 75 parts by weight of acetophenone oxime or of diacetyl monoxime or of cyclohexanone oxime or of furfural oxime. Within the limits stated, the amount of plasticizer may be decreased or increased, depending upon whether it is desired to decrease or increase, respectively, the properties which these plasticizers contribute to the finished product. The amount of solvent employed may also be increased or decreased, depending upon whether it is desired to have a more or less freely flowing composition, respectively.

A composition of matter prepared as above described may be deposited upon any suitable film-forming surface to form a film or sheet, in a manner well known to those skilled in the art. A film so produced has permanently brilliant transparency (even where as much as 50 to 60 parts of the oxime per 100 parts of cellulose organic ester, such as cellulose acetate, is used) and low inflammability, burning no more readily than ordinary newsprint. Films or sheets produced in accordance with my invention are quite tough and flexible. For instance, films of cellulose acetate plasticized with 10% to 75% (parts by weight based on the cellulose acetate) of acetophenone oxime had an initial flexibility from 100% to 565% greater than that of film containing no plasticizer, films plasticized with 10% to 75% of diacetyl monoxime had an initial flexibility from 65% to 300% greater than that of film containing no plasticizer, a film plasticized with 15% of cyclohexanone oxime had an initial flexibility 65% greater than that of a film containing no plasticizer, and films containing from 10% to 20% of furfural oxime had an initial flexibility from 35% to 165% greater than that of a film containing no plasticizer. Furthermore, film so plasticized maintains flexibility in a superior fashion. For instance, films containing 30% of acetophenone oxime or 50% of diacetyl monoxime or from 10 to 20% of furfural oxime maintained flexibility at 65° C. for 150 days, whereas an unplasticized film became brittle in 30 days. This indicates that films so plasticized will withstand ordinary usage satisfactorily for many years. The sum total of the above advantageous properties of products produced from my new compositions is considerably in excess of that of products produced with what have previously been regarded as the better plasticizers.

Other similar solvents (instead of acetone) which are compatible with the cellulose acetate and my new plasticizers may also occur to those skilled in this art. In like manner these plasticizers may be compounded with other single organic esters of cellulose, such as cellulose propionate, butyrate and the like, or with mixed organic esters, such as cellulose aceto-stearate, cellulose aceto-propionate, or cellulose aceto-malate, a suitable solvent which will dissolve both the cellulosic derivative and the plasticizer being employed.

Inasmuch as my above-described compositions of matter are useful in the production of films and sheets, it will be apparent that my new plasticizers may also be employed with advantage in the other branches of the plastic art. For instance, my above-described compositions of matter may be employed in the manufacture of artificial silk by the dry spinning method. With the proper coagulating bath they may also be employed for wet spinning. It may be desired to employ compositions of different viscosity or evaporation characteristics, but this is a mere matter of changing the solvent proportion or adding evaporation retardents or other high or intermediate boiling constituents, as has been well known in the art for more than a decade. My novel plasticizers may also be employed with advantage in connection with a number of the known lacquer and various formulae with which they may be found to be compatible. In such cases the plasticizer is usually first put into solution in the cellulose derivative solution, and if nonsolvents are added for the purpose of cheapening the composition they are added only to such an extent as will not precipitate the derivative from solution. Also the plasticizer is usually employed in relatively large amounts, such as from 50 to 60 parts, in compounding lacquers. Other uses within the scope of my invention will also suggest themselves to those skilled in the art and are to be included within the scope of the claims appended hereto.

These oximes may also be advantageously used as plasticizers in cellulose acetate molding compositions. For instance, when about 20% or 30% (parts by weight based on the cellulose acetate) of acetophenone oxime or of diacetyl monoxime or of cyclohexanone oxime or of furfural oxime is homogeneously mixed with cellulose acetate, the mixture may be converted into a hard, translucent plastic product by molding at a temperature of about 140° C. and a pressure of from 2500 to 4000 pounds per square inch for a period of from 2 to 5 minutes, in a manner already known to those skilled in molding compounds of that nature.

What I claim as my invention and desire to be secured by Letters Patent of the United States is:

1. A composition of matter comprising an organic ester of cellulose and an oxime selected from the group consisting of acetophenone oxime, diacetyl monoxime, cyclohexanone oxime and furfural oxime.

2. A composition of matter comprising cellulose acetate and an oxime selected from the group consisting of acetophenone oxime, diacetyl monoxime, cyclohexanone oxime and furfural oxime.

3. A composition of matter comprising cellulose acetate and acetophenone oxime.

4. A composition of matter comprising cellulose acetate and diacetyl monoxime.

5. A composition of matter comprising cellulose acetate and furfural oxime.

6. A composition of matter comprising 100 parts of cellulose acetate and about 10 to 75 parts, by weight, of an oxime selected from the group consisting of acetophenone oxime, diacetyl monoxime, cyclohexanone oxime and furfural oxime.

7. A relatively thin sheet comprising 100 parts of cellulose acetate and about 10 to 75 parts, by weight, of an oxime selected from the group consisting of acetophenone oxime, diacetyl monoxime, cyclohexanone oxime and furfural oxime.

8. A molding composition adapted to molding under elevated temperatures and high pressures, comprising cellulose acetate and an oxime selected from the group consisting of acetophenone oxime, diacetyl monoxime, cyclohexanone oxime and furfural oxime.

Signed at Rochester, New York this 6th day of January, 1932.

HENRY B. SMITH.